(12) United States Patent
Venken

(10) Patent No.: US 8,023,993 B2
(45) Date of Patent: Sep. 20, 2011

(54) MOBILE TERMINAL AND NETWORK UNIT FOR MULTI-WIRELESS TECHNOLOGIES

(75) Inventor: Kristiaan Johan Hubert Ghislanus Venken, Schilde (BE)

(73) Assignee: Alcatel Lucent, Paris (FR)

( * ) Notice: Subject to any disclaimer, the term of this patent is extended or adjusted under 35 U.S.C. 154(b) by 1135 days.

(21) Appl. No.: 11/305,017

(22) Filed: Dec. 19, 2005

(65) Prior Publication Data

US 2006/0153209 A1 Jul. 13, 2006

(30) Foreign Application Priority Data

Dec. 22, 2004 (EP) .................................... 04293078

(51) Int. Cl.
*H04M 1/00* (2006.01)
(52) U.S. Cl. .................................. 455/552.1; 455/554.2
(58) Field of Classification Search .................. 455/448, 455/552.1, 426.1, 553.1
See application file for complete search history.

(56) References Cited

U.S. PATENT DOCUMENTS

| 6,178,337 B1 * | 1/2001 | Spartz et al. ................... 455/561 |
| 6,961,583 B2 * | 11/2005 | Moles et al. ................ 455/552.1 |
| 7,136,641 B2 * | 11/2006 | Pecen et al. .................... 455/428 |

FOREIGN PATENT DOCUMENTS

| EP | 1 424 810 A1 | 6/2004 |
| EP | 1 453 248 A2 | 9/2004 |
| WO | WO 02/087160 A2 | 10/2002 |

* cited by examiner

*Primary Examiner* — Lester Kincaid
*Assistant Examiner* — Joel Ajayi
(74) *Attorney, Agent, or Firm* — Fay Sharpe LLP

(57) ABSTRACT

Mobile terminals (2) for transmitting first signaling signals (11) according to first wireless technologies to first networks (3) and for transmitting second signaling signals (12) according to second wireless technologies to second networks (4), which first signaling signals (11) comprise first information for informing the first networks (3), which second signaling signals (12) comprise second information for informing the second networks (4), and which first and second wireless technologies are different from each other, get a better efficiency by letting the first signaling signals (11) comprise the first information and the second information. This way, the power consumption of the mobile terminals (2) is reduced and the signaling efficiency is increased. The first/second information comprises first/second location information and/or comprises first/second paging-response information.

17 Claims, 2 Drawing Sheets

MOBILE TERMINAL AND NETWORK UNIT FOR MULTI-WIRELESS TECHNOLOGIES

Figure 1:
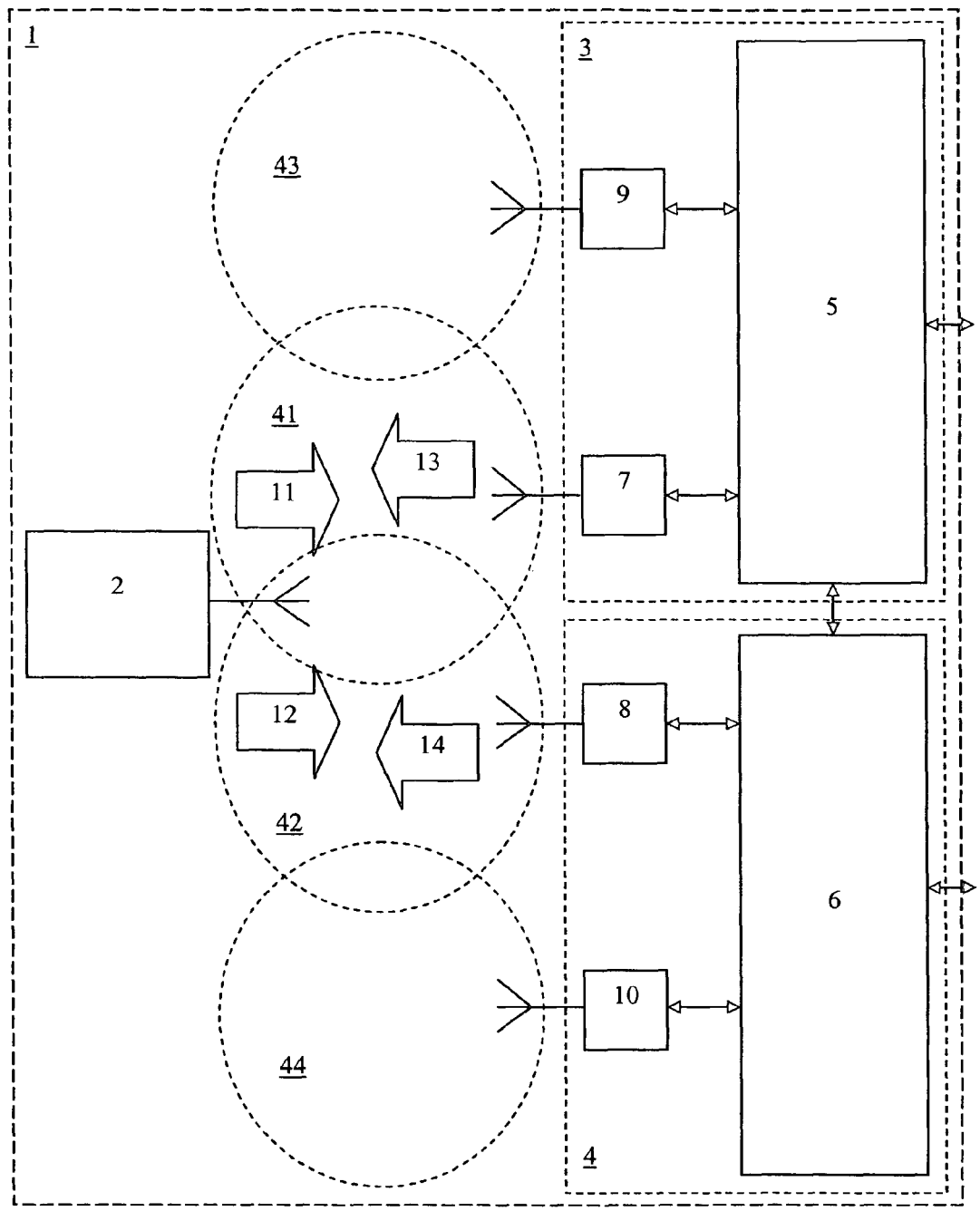

The invention relates to a mobile terminal for transmitting a first signaling signal according to a first wireless technology to a first network and for transmitting a second signaling signal according to a second wireless technology to a second network, the first signaling signal comprising first information for informing the first network, the second signaling signal comprising second information for informing the second network, and the first and second wireless technologies being different from each other.

Examples of the first wireless technology and/or of the second wireless technology are UMTS, GPRS, GSM, DECT, wireless LAN and BLUETOOTH.

A prior art mobile terminal is of common general knowledge and comprises for example a tri band or quad band mobile terminal. Such a mobile terminal has the capability to communicate via three or four different wireless technologies, apart from further wireless technologies such as Bluetooth etc. The mobile terminal can for example send a response or an indication to a first network by sending first information to this first network and can for example send a response or an indication to a second network by sending second information to this second network.

The known mobile terminal is disadvantageous, inter alia, owing to the fact that it is relatively inefficient. The mobile terminal for example sends a response or an indication to different networks by sending different signals according to different technologies to the different networks in a relatively non coordinated way.

It is an object of the invention, inter alia, to provide a mobile terminal as defined above which is relatively efficient.

The mobile terminal according to the invention is characterized in that the first signaling signal comprises the first information and comprises the second information.

By adding the second information to the first signaling signal which already comprises the first information, the mobile terminal for example sends a response or an indication to the first network directly and to the second network indirectly by sending the first information and the second information via the first signaling signal according to the first technology to the first network and the first network for example relays the second information to the second network, this all in a relatively coordinated way. This way, the mobile terminal sends a response or an indication to only one network, but both networks are informed, the first network directly and the second network indirectly. As a result, the mobile terminal according to the invention is relatively efficient.

The mobile terminal according to the invention is further advantageous in that the power consumption of the mobile terminal is reduced.

The first wireless technology and/or the second wireless technology can be UMTS, GPRS, GSM, DECT, wireless LAN and BLUETOOTH, but can also be a further wireless technology to be developed yet, such as 4G. The fact that both wireless technologies are different from each other comprises a use of different frequency bands and/or wavelengths, a use of different time slot schemes and/or modulation schemes and/or coding schemes, without excluding further different wireless technologies.

An embodiment of the mobile terminal according to the invention is characterized in that the first information comprises first location information and the second information comprises second location information.

The first network for example regularly broadcasts a first area identification per cell area and the mobile terminal reacts by sending back the first location information to acknowledge its presence in the cell area. The second network for example regularly broadcasts a second area identification per cell area and the mobile terminal reacts by sending back the second location information to acknowledge its presence in the cell area. According to the invention, the first location information and the second location information are not sent back separately via separate signaling signals, but are sent back combinedly via the first signaling signal. This might also be done in response to the broadcasted first area identification without being triggered by a broadcast of the second area identification.

An embodiment of the mobile terminal according to the invention is characterized in that the first information comprises first paging-response information and the second information comprises second paging-response information.

The first network for example sends a first paging-request and the mobile terminal reacts by sending back the first paging-response information to acknowledge its readiness to accept a call. The second network for example sends a second paging-request and the mobile terminal reacts by sending back the second paging-response information to acknowledge its readiness to accept a call. According to the invention, the first paging-response information and the second paging-response information are not sent back separately via separate signaling signals, but are sent back combinedly via the first signaling signal. This might also be done in response to the first paging-request without being triggered by a transmission of the second paging-request.

An embodiment of the mobile terminal according to the invention is characterized in that the mobile terminal comprises a terminal controller for selecting the first signaling signal carrying the first and second information.

The terminal controller selects the first signaling signal to carry the first and second information, which selection is based on for example terminal characteristics such as a signal quality, a signal strength, a power consumption etc.

The invention also relates to a network unit for use in combination with a mobile terminal for transmitting a first signaling signal according to a first wireless technology to a first network and for transmitting a second signaling signal according to a second wireless technology to a second network, the first signaling signal comprising first information for informing the first network, the second signaling signal comprising second information for informing the second network, and the first and second wireless technologies being different from each other, which network unit according to the invention is characterized in that the first signaling signal comprises the first information and comprises the second information, the network unit forming part of the first network and being arranged to extract the second information from the first signaling signal and to relay this second information to the second network.

An embodiment of the network unit according to the invention is characterized in that the first information comprises first location information and the second information comprises second location information.

An embodiment of the network unit according to the invention is characterized in that the first information comprises first paging-response information and the second information comprises second paging-response information.

An embodiment of the network unit according to the invention is characterized in that the network unit comprises a network controller for selecting the first signaling signal carrying the first and second information.

The network controller selects the first signaling signal to carry the first and second information, which selection is based on for example network characteristics such as network congestion, network traffic, costs etc., and is arranged to inform the mobile terminal thereof.

The invention also relates to a method for transmitting a first signaling signal according to a first wireless technology to a first network and for transmitting a second signaling signal according to a second wireless technology to a second network, the first signaling signal comprising first information for informing the first network, the second signaling signal comprising second information for informing the second network, and the first and second wireless technologies being different from each other, which method is characterized in that the first signaling signal comprises the first information and comprises the second information.

The invention also relates to a processor program product for transmitting a first signaling signal according to a first wireless technology to a first network and for transmitting a second signaling signal according to a second wireless technology to a second network, the first signaling signal comprising first information for informing the first network, the second signaling signal comprising second information for informing the second network, and the first and second wireless technologies being different from each other, which processor program product is characterized in that the first signaling signal comprises the first information and comprises the second information.

The invention also relates to a first signaling signal for use in combination with a mobile terminal for transmitting the first signaling signal according to a first wireless technology to a first network and for transmitting a second signaling signal according to a second wireless technology to a second network, the first signaling signal comprising first information for informing the first network, the second signaling signal comprising second information for informing the second network, and the first and second wireless technologies being different from each other, which first signaling signal is characterized in that the first signaling signal comprises the first information and comprises the second information.

Embodiments of the method according to the invention and of the processor program product according to the invention and of the first signaling signal according to the invention correspond with the relevant embodiments of the mobile terminal according to the invention.

The invention is based upon an insight, inter alia, that the different networks in the prior art are relatively non coordinated, and is based upon a basic idea, inter alia, that the different networks according to the invention should be made relatively coordinated by letting a signaling signal comprise the first information as well as the second information.

The invention solves the problem, inter alia, to provide a mobile terminal which is relatively efficient, and is advantageous, inter alia, in that the power consumption of the mobile terminal is reduced and in that the signaling efficiency is increased.

These and other aspects of the invention will be apparent from and elucidated with reference to the embodiment(s) described hereinafter.

Figure 2:
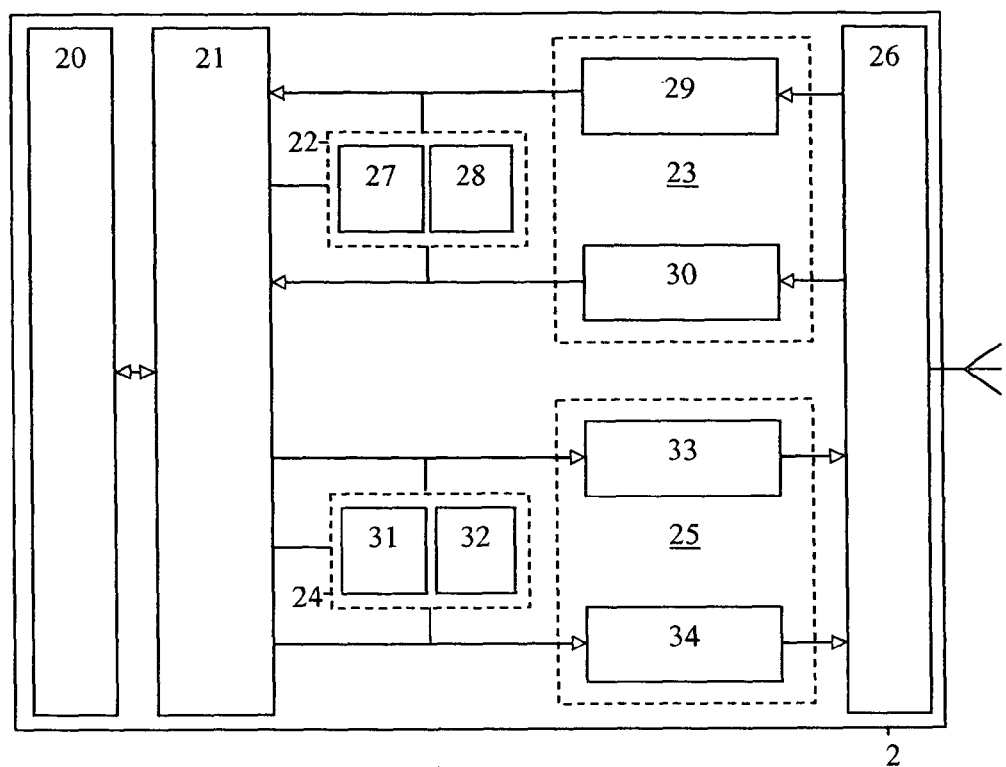
Figure 3:
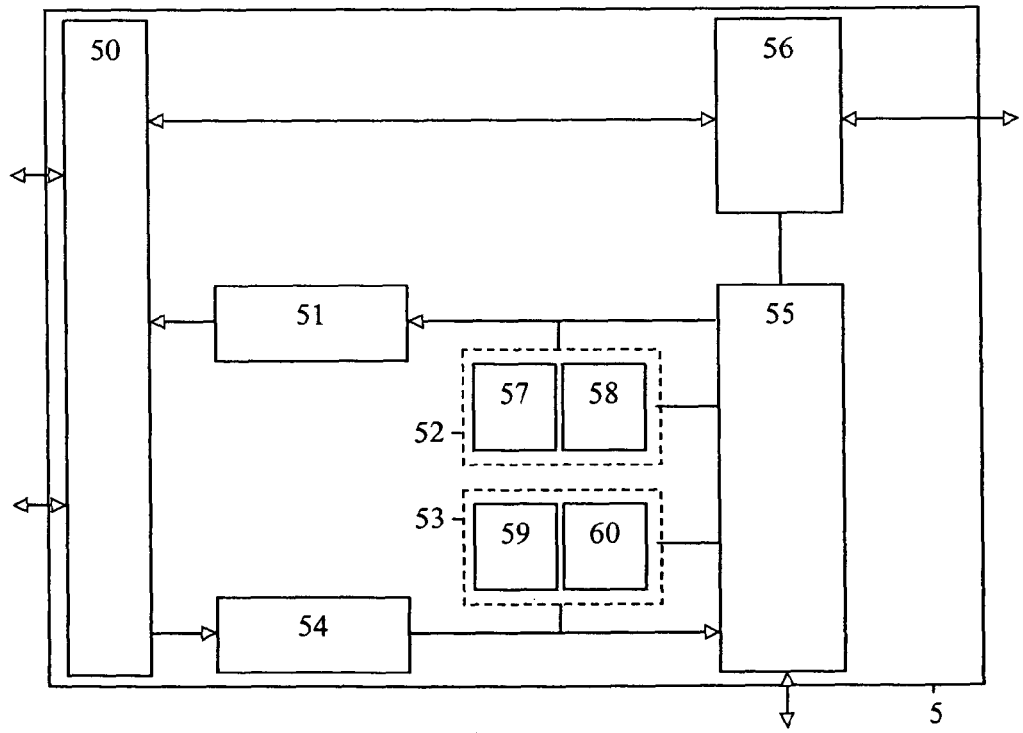

FIG. 1 shows diagrammatically a system comprising a mobile terminal according to the invention and a first network with a network unit according to the invention and a second network, FIG. 2 shows diagrammatically a mobile terminal according to the invention in greater detail, and FIG. 3 shows diagrammatically a network unit according to the invention in greater detail.

The system 1 shown in FIG. 1 comprises a mobile terminal 2 according to the invention and a first network 3 with a first network unit 5 according to the invention and a second network 4 with a second network unit 6 according to the invention. The first network unit 5 is coupled to a station 7 for serving a first service area 41 and to a station 9 for serving a third service area 43. The second network unit 6 is coupled to a station 8 for serving a second service area 42 and to a station 10 for serving a fourth service area 44. The mobile terminal 2 sends a first signaling signal 11 to the station 7 and sends a second signaling signal 12 to the station 8, and receives a third signal 13 from the station 7 and receives a fourth signal 14 from the station 8.

The mobile terminal 2 according to the invention shown in FIG. 2 comprises a man machine interface 20 coupled to a terminal controller 21. The terminal controller 21 is coupled to a receiver system 23 comprising a first receiver 29 and a second receiver 30 and to a transmitter system 25 comprising a first transmitter 33 and a second transmitter 34. The receivers 29,30 and the transmitters 33,34 are coupled via an interface 26 to an antenna. The terminal controller 21 and the receiver system 23 are further coupled to a detector system 22 comprising a first detector 27 and a second detector 28. The terminal controller 21 and the transmitter system 25 are further coupled to a generator system 24 comprising a first generator 31 and a second generator 32.

The network unit 5 according to the invention shown in FIG. 3 comprises a switch 50 coupled to the stations 7,9 and to a transmitter 51 and to a receiver 54. The transmitter 51 is coupled to a network controller 55 and to a generator system 52 comprising a first generator 57 and a second generator 58 and also coupled to the network controller 55. The receiver 54 is coupled to the network controller 55 and to a detector system 53 comprising a first detector 59 and a second detector 60 and also coupled to the network controller 55. The switch 50 is further coupled to an interface 56 further coupled to the network controller 55 and to a fixed network. The network controller 55 is further coupled to the network unit 6

The second network unit 6 not shown comprises a switch 70 coupled to the stations 8,10 and to a transmitter 71 and to a receiver 74. The transmitter 71 is coupled to a network controller 75 and to a generator system 72 comprising a first generator 77 and a second generator 78 and also coupled to the network controller 75. The receiver 74 is coupled to the network controller 75 and to a detector system 73 comprising a first detector 79 and a second detector 80 and also coupled to the network controller 75. The switch 70 is further coupled to an interface 76 further coupled to the network controller 75 and to a fixed network. The network controller 75 is further coupled to the network controller 55 of the network unit 5.

The first receiver 29 and the first transmitter 33 and the stations 7,9 operate in accordance with a first wireless technology, and the second receiver 30 and the second transmitter 34 and the stations 8,10 operate in accordance with a second wireless technology. The first wireless technology and/or the second wireless technology can be UMTS, GPRS, GSM, DECT, wireless LAN and BLUETOOTH, but can also be a further wireless technology to be developed yet, such as 4G.

In a prior art situation, a prior art mobile terminal comprises for example a tri band or quad band mobile terminal. Such a mobile terminal has the capability to communicate via three or four different wireless technologies, apart from further wireless technologies such as Bluetooth etc. The mobile terminal can for example send a response or an indication to the first network 3 by sending to this first network 3 the first signaling signal 11 comprising first information for informing this first network 3 and can for example send a response or an indication to the second network 4 by sending to this second network 4 the second signaling signal 12 comprising second information for informing this second network 4. This is relatively inefficient. The mobile terminal for example sends a response or an indication to different networks by sending different signals according to different technologies to the different networks in a relatively non coordinated way.

According to the invention, the mobile terminal 2 according to the invention sends the first signaling signal 11, which comprises the first information and comprises the second information.

By adding the second information to the first signaling signal 11 which already comprises the first information, the mobile terminal 2 for example sends a response or an indication to the first network 3 directly and to the second network 4 indirectly by sending the first information and the second information via the first signaling signal 11 according to the first technology to the first network 3 and the first network 3 for example relays the second information to the second network 4, this all in a relatively coordinated way. This way, the mobile terminal 2 sends a response or an indication to only one network 3, but both networks 3 and 4 are informed, the first network 3 directly and the second network 4 indirectly. As a result, the mobile terminal 2 according to the invention is relatively efficient.

The mobile terminal 2 according to the invention is further advantageous in that the power consumption of the mobile terminal is reduced.

The first information comprises for example first location information and the second information comprises for example second location information. The first network 3 for example regularly broadcasts a first area identification per cell area (or service area) via the third signal 13 and the mobile terminal 2 reacts by sending back the first location information to acknowledge its presence in the cell area. The second network 4 for example regularly broadcasts a second area identification per cell area (or service area) via the fourth signal 14 and the mobile terminal 2 reacts by sending back the second location information to acknowledge its presence in the cell area. According to the invention, the first location information and the second location information are not sent back separately via separate signaling signals 11 and 12, but are sent back combinedly via the first signaling signal 11. This might also be done in response to the broadcasted first area identification without being triggered by a broadcast of the second area identification.

Alternatively, the first information comprises for example first paging-response information and the second information for example comprises second paging-response information. The first network 3 for example sends a first paging-request via the third signal 13 and the mobile terminal 2 reacts by sending back the first paging-response information to acknowledge its readiness to accept a call. The second network 4 for example sends a second paging-request via the fourth signal 14 and the mobile terminal 2 reacts by sending back the second paging-response information to acknowledge its readiness to accept a call. According to the invention, the first paging-response information and the second paging-response information are not sent back separately via separate signaling signals 11 and 12, but are sent back combinedly via the first signaling signal 11. This might also be done in response to the first paging-request without being triggered by a transmission of the second paging-request.

The terminal controller 21 for example selects the first signaling signal 11 carrying the first and second information. This is for example done based on for example a signal quality, a signal strength, a power consumption etc. Such parameters can be detected via the detector 27 with respect to the first wireless technology and via the detector 28 with respect to the second wireless technology.

The generator 31 for example generates the first information and the generator 32 for example generates the second information. The receiver 29 receives for example the first area identification from the first network 3 or the first paging-request from the first network 3 for example via the third signal 13. The receiver 30 receives for example the second area identification from the second network 4 or the second paging-request from the second network 4 for example via the fourth signal 14. The transmitter 33 transmits for example the first signaling signal 11. The transmitter 34 transmits for example the second signaling signal 12.

Alternatively, the network controller 55 for example selects the first signaling signal 11 carrying the first and second information. This is for example done based on for example network congestion, network traffic, costs etc. Such parameters can be detected via the detector 59 with respect to the first wireless technology and via the detector 79 (not shown) with respect to the second wireless technology, whereby both network controllers 55 and 75 (not shown) might need to negotiate with each other. The network controller 55 is further arranged to inform the mobile terminal 2 thereof. Thereto, for example the generator 57 generates an instruction to be transmitted via for example the third signal 13 and to be received via for example the receiver 29. In response to this instruction, the terminal controller 21 will take action.

The detector 60 for example detects the first information and the second information in the first signaling signal 11, and the network controller 55 extracts the second information and supplies it to the network controller 75. The generator 58 for example generates the first area identification and/or the first paging-request. Audio and/or video will flow via the interface 56, controlled by the network controller 55.

The invention has been described for two different wireless technologies, but three or more different wireless technologies might be present.

The expression "for" in for example "for transmitting" and "for informing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The steps/functions of transmitting and informing etc. do not exclude further steps/functions, like for example, inter alia, the steps/functions as described for the figures.

The invention claimed is:

1. A mobile terminal for transmitting signaling signals according to a plurality of wireless technologies, said mobile terminal comprising:
    at least two wireless communication systems, wherein each of the at least two wireless communications systems is operative to communicate with a different wireless network; and,
    a controller that selects one of the at least two wireless communications systems and uses the selected wireless communications system to transmit a signaling signal to the wireless network associated with the selected wireless communications system, wherein the signaling signal includes individual signaling information for each of the different wireless networks, wherein the individual signaling information for the each of the different wireless networks includes at least one of location information and paging response information.

2. The mobile terminal of claim 1, wherein the each of the at least two wireless communications systems uses a different wireless technology.

3. The mobile terminal of claim 1, wherein the controller transmits the signaling signal to a fixed network unit associated with the wireless network associated with the selected wireless communications system, wherein the fixed network unit relays the individual signaling information for the each of the different wireless networks to the each of the different wireless networks.

4. The mobile terminal of claim 1, wherein the each of the different wireless networks includes a fixed network unit, wherein the fixed network units are interconnected via a communications network.

5. The mobile terminal of claim 4, wherein the controller receives instructions from the fixed network unit of one of the different wireless networks, wherein the instructions instruct the controller as to which one of the at least two wireless communications systems to select.

6. The mobile terminal of claim 5, wherein the fixed network unit of the one of the different wireless networks instructs the mobile terminal based on at least one of network congestion, network traffic, and costs.

7. The mobile terminal of claim 5, wherein the instructions are determined through negotiation between the fixed network units.

8. The mobile terminal of claim 1, wherein the controller selects the signaling signal based upon at least one of signal quality, signal strength, and power consumption.

9. The mobile terminal of claim 1, wherein the controller transmits the signaling signal in response to receiving an area identification message and/or a paging-request message from one of the different wireless networks.

10. The mobile terminal of claim 1, wherein the mobile station communicates directly with the wireless network associated with the selected wireless communications system via a base station associated with the wireless network, wherein the mobile station communicates indirectly with the different wireless networks associated with the unselected wireless communications systems via the base station associated with the wireless network.

11. The mobile terminal of claim 1, wherein the mobile station is directly connected wirelessly to a base station of the each of the different wireless networks.

12. A fixed network unit associated with a wireless network, said network unit comprising:
an interface for communicating with at least one other wireless network;
a wireless communications system that receives a signaling signal from a mobile station, wherein the signaling signal includes individual signaling information for the wireless network and each of the at least one other wireless network; and,
a controller that relays the individual signaling information for the each of the at least one other wireless network over the interface to the each of the at least one other wireless network, wherein the individual signaling information for the each of the different wireless networks includes at least one of location information and paging response information.

13. The fixed network unit of claim 12, wherein the mobile station includes a wireless communications system operative to communicate with the wireless network and at least one other wireless communications system, wherein each of the at least one other wireless communications system is operative to communicate with a different one of the at least one other wireless network.

14. A method for transmitting signaling signals from a mobile station, said method comprising:
selecting one of at least two wireless communication systems of the mobile station, wherein each of the at least two wireless communications systems is operative to communicate with a different wireless network; and,
using the selected wireless communications system to transmit a signaling signal to the different wireless network associated with the selected wireless communications system, wherein the signaling signal includes individual signaling information for each of the different wireless networks, wherein the individual signaling information for the each of the different wireless networks includes at least one of location information and paging response information.

15. A processor program for transmitting signaling signals from a mobile station, said processor program comprising:
selecting one of at least two wireless communication systems of the mobile station, wherein each of the at least two wireless communications systems is operative to communicate with a different wireless network; and,
using the selected wireless communication system to transmit a signaling signal to the different wireless network associated with the selected wireless communications system, wherein the signaling signal includes individual signaling information for each of the different wireless networks, wherein the individual signaling information for the each of the different wireless networks includes at least one of location information and paging response information.

16. The mobile terminal of claim 4, wherein the fixed network unit of the each of the different wireless networks is individual to the each of the different wireless networks.

17. The fixed network unit of claim 13, wherein the controller instructs the mobile station as to which wireless communication system to use.

* * * * *